(12) United States Patent
Kim et al.

(10) Patent No.: US 10,979,675 B2
(45) Date of Patent: Apr. 13, 2021

(54) VIDEO MONITORING APPARATUS FOR DISPLAYING EVENT INFORMATION

(71) Applicant: HANWHA TECHWIN CO., LTD., Seongnam-si (KR)

(72) Inventors: Doo Man Kim, Seongnam-si (KR); Hyeon Gu Hwang, Seongnam-si (KR); Jun Yong Kim, Seongnam-si (KR); Gyeong Yeol Park, Seongnam-si (KR); Han Ki Choi, Seongnam-si (KR); Ho Jin Choi, Seongnam-si (KR)

(73) Assignee: HANWHA TECHWIN CO., LTD., Seongnam-si (KR)

(*) Notice: Subject to any disclaimer, the term of this patent is extended or adjusted under 35 U.S.C. 154(b) by 0 days.

(21) Appl. No.: 16/422,482

(22) Filed: May 24, 2019

(65) Prior Publication Data
US 2019/0281257 A1    Sep. 12, 2019

Related U.S. Application Data

(63) Continuation of application No. PCT/KR2017/011650, filed on Oct. 20, 2017.

(30) Foreign Application Priority Data

Nov. 30, 2016    (KR) .................. 10-2016-0161925

(51) Int. Cl.
*H04N 7/18* (2006.01)
*G06F 3/0484* (2013.01)
(Continued)

(52) U.S. Cl.
CPC .......... *H04N 7/181* (2013.01); *G06F 3/04842* (2013.01); *G06F 3/04845* (2013.01);
(Continued)

(58) Field of Classification Search
CPC ....... G06F 2203/04806; G06F 3/04842; G06F 3/04845; G06K 2009/00738;
(Continued)

(56) References Cited

U.S. PATENT DOCUMENTS 8,725,526 B2* 5/2014 Cobbs ................. G16H 40/20
                                                    705/2
9,639,937 B2    5/2017 Jo
(Continued)

FOREIGN PATENT DOCUMENTS

KR    10-2011-0026287 A    3/2011
KR    10-2014-0039927 A    4/2014
(Continued)

OTHER PUBLICATIONS

Search Report dated Jan. 30, 2018, issued by the International Searching Authority in International Application No. PCT/KR2017/011650 (PCT/ISA/210).

*Primary Examiner* — Farzana Hossain
(74) *Attorney, Agent, or Firm* — Sughrue Mion, PLLC

(57) ABSTRACT

Provided is a video monitoring apparatus connectable to at least one camera which acquires at least one first video by photographing at least one monitoring area, the video monitoring apparatus including at least one processor to implement; a video display generator configured to display a second video of a display area which is included in the monitoring area; an event detector configured to detect whether an event has occurred in the monitoring area; and a marker display generator configured to display an event marker indicating occurrence of the event on the second video when the event has occurred in the monitoring area except the display area.

20 Claims, 14 Drawing Sheets

(51) Int. Cl.
- *G06K 9/00* (2006.01)
- *H04N 5/45* (2011.01)
- *G08B 13/196* (2006.01)
- *G08B 21/04* (2006.01)

(52) U.S. Cl.
CPC ..... *G06K 9/00718* (2013.01); *G06K 9/00771* (2013.01); *G08B 13/196* (2013.01); *G08B 21/04* (2013.01); *H04N 5/45* (2013.01); *H04N 7/18* (2013.01); *G06F 2203/04806* (2013.01); *G06K 2009/00738* (2013.01)

(58) Field of Classification Search
CPC ........... G06K 9/00718; G06K 9/00771; G06K 9/209; G08B 13/196; G08B 21/04; H04N 5/144; H04N 5/45; H04N 7/18; H04N 7/181

See application file for complete search history.

(56) References Cited

U.S. PATENT DOCUMENTS

| | | | | |
|---|---|---|---|---|
| 2006/0239645 A1* | 10/2006 | Curtner | ............ | G08B 13/19606 386/228 |
| 2007/0065014 A1* | 3/2007 | Owechko | ................. | G06K 9/42 382/190 |
| 2008/0055423 A1* | 3/2008 | Ying | ................. | G08B 13/19684 348/211.99 |
| 2008/0291278 A1* | 11/2008 | Zhang | ................. | G06K 9/00771 348/159 |
| 2010/0156630 A1* | 6/2010 | Ainsbury | ................. | G07C 9/27 340/540 |
| 2010/0271478 A1* | 10/2010 | Oya | ......................... | H04N 5/76 348/143 |
| 2011/0013018 A1* | 1/2011 | Leblond | .................. | G06T 17/05 348/143 |
| 2011/0170744 A1* | 7/2011 | Malinovskiy | ....... | G06K 9/00771 382/103 |
| 2014/0237493 A1* | 8/2014 | Russo | .................... | H04N 7/181 725/5 |
| 2014/0266656 A1* | 9/2014 | Ng-Thow-Hing | ..... | G08G 1/166 340/435 |
| 2014/0313330 A1* | 10/2014 | Carey | ................ | G06K 9/00778 348/143 |
| 2014/0362225 A1* | 12/2014 | Ramalingamoorthy | ..................... | H04N 7/188 348/159 |
| 2015/0145991 A1* | 5/2015 | Russell | .................. | H04N 7/181 348/143 |
| 2016/0034762 A1* | 2/2016 | Chang | ...................... | G08B 1/08 345/633 |
| 2017/0177287 A1* | 6/2017 | Jeong | ...................... | G06F 3/147 |
| 2018/0025233 A1* | 1/2018 | Iwai | ................. | G06K 9/00771 348/143 |
| 2018/0053064 A1* | 2/2018 | Lim | ......................... | G06F 16/50 |
| 2018/0151072 A1* | 5/2018 | Altinger | .................. | G08G 1/04 |
| 2018/0343442 A1* | 11/2018 | Yoshikawa | ....... | G08B 13/19608 |
| 2019/0174070 A1* | 6/2019 | Jang | ................. | H04N 5/232945 |

FOREIGN PATENT DOCUMENTS

| | | |
|---|---|---|
| KR | 10-2014-0110684 A | 9/2014 |
| KR | 10-2015-0073692 A | 7/2015 |
| KR | 10-2016-0094655 A | 8/2016 |

* cited by examiner

VIDEO MONITORING APPARATUS FOR DISPLAYING EVENT INFORMATION

CROSS-REFERENCE TO THE RELATED APPLICATION

This application is a continuation of International Application No. PCT/KR2017/011650, filed Oct. 20, 2017 which claims priority from Korean Patent Application No. 10-2016-0161925 filed on Nov. 30, 2016, in the Korean Intellectual Property Office, the disclosures of which are incorporated herein in their entirety by reference

BACKGROUND

1. Field

Apparatuses consistent with exemplary embodiments of the inventive concept relate to video monitoring, and more particularly, to video monitoring for displaying, on a screen, information about an event occurring in an area other than a display area which is displayed on the screen when there is a monitoring area photographed by a camera and the display area is in the monitoring area.

2. Description of the Related Art

With the growing importance of surveillance cameras in preventing and resolving accidents, surveillance cameras which support a high resolution are coming into use. Resolutions supported by high-definition surveillance cameras include ultra-high definition (UHD; 3840×2160) and 8K UHD (7680×4320). UHD is a resolution which is nine times higher than that of HD (1280×720) and four times higher than that of full HD (FHD; 1920×1080), and 8K UHD is a resolution which is 16 times higher than that of FHD. Since a UHD video has about 8,300,000 pixels and an 8K UHD video has about 33,000,000 pixels, it is possible to acquire a clear video of a monitoring area using a high-definition surveillance camera.

High performance of a high-definition surveillance camera may attract attention in the case of photographing a wide range of a monitoring area. When a UHD surveillance camera is used to photograph a city which is full of buildings, it is possible to acquire a video which is clear enough to distinguish individual windows from each other. Also, when a UHD surveillance camera is used to take aerial photographs, it is possible to acquire a video in which vehicles on roads are clearly distinguished.

However, even when a wide range of a monitoring area is photographed with a high-definition surveillance camera, a screen size is limited. For this reason, when an entire photographed monitoring area is to be displayed on a screen, objects in the monitoring area may be displayed too small to be recognizable. Therefore, for intensive and efficient monitoring, it is necessary to distinguish the photographed monitoring area and a display area, included in the monitoring area, to be enlarged and displayed on the screen.

Also, when a fisheye lens is used in a surveillance camera, a similar problem happens. Due to a short focal length of the fisheye lens, a warped video is captured by the fisheye lens camera. When the captured video is dewarped through mapping, the warped video is converted into a normal video, but the area of the video displayed on a screen increases because the warped video is spread. Therefore, it is necessary to distinguish a monitoring area photographed through the fisheye lens and a display area, included in the monitoring area, to be displayed on the screen considering a limited screen size.

Even when a plurality of surveillance cameras are used, it is necessary to distinguish a monitoring area and a display area. Even if a plurality of surveillance cameras photograph different areas or photograph a monitoring area at different angles, people are not able to recognize all the areas photographed by the plurality of surveillance cameras at once, and a screen size is limited. Therefore, it is necessary to display an area photographed by one camera on a screen among the areas photographed by the plurality of surveillance cameras.

However, in the case of displaying a display area smaller than a monitoring area photographed by a surveillance camera, when an event occurs in an area other than the display area, a user is not able to visually recognize the event. Therefore, there is a need for a video monitoring system to provide a user with information about a location or type of an event which has occurred outside the display area.

SUMMARY

The exemplary embodiments provide a video monitoring apparatus for displaying a display area in a monitoring area photographed by a camera, the video monitoring apparatus displaying information about an event occurring in an area other than the display area. The exemplary embodiments also provide a video monitoring apparatus for displaying detailed information about an event which has occurred such as a location at which the even has occurred and a type of the event so that a user may immediately deal with the event which has occurred.

According to exemplary embodiments, there is provided a video monitoring apparatus connectable to at least one camera which acquires at least one first video by photographing at least one monitoring area. The video monitoring apparatus may include at least one processor to implement: a video display generator configured to display a second video of a display area which is included in the monitoring area, on a screen of a display device; an event detector configured to detect whether an event has occurred in the monitoring area; and a marker display generator configured to display an event marker indicating occurrence of the event on the second video when the event has occurred in the monitoring area except the display area.

In the video monitoring apparatus, when a plurality of events occur, the marker display generator may display a plurality of event markers corresponding to the plurality of events on the second video.

In the video monitoring apparatus, the first video may be a video warped by a fisheye lens, and the second video may be a video obtained by dewarping the warped video through mapping.

In the video monitoring apparatus, the monitoring area may be all areas photographed by a plurality of cameras, and the display area may be an area photographed by a first camera among the plurality of cameras.

The video monitoring apparatus may further include an event analyzer configured to analyze a detected event, and the event marker may include analysis information about the event analyzer.

In the video monitoring apparatus, the event detector may further include a function of detecting a location of a monitoring target in the monitoring area, and the marker display generator may further include a function of displaying an event marker indicating the location of the monitoring target on the second video when the detected location of the specific monitoring target is in the monitoring area except the display area.

According to the exemplary embodiments, a user can be provided with detailed information about an event which has occurred outside a display area, and accordingly, it is possible to immediately switch a screen to the location at which the event has occurred and visually check the event. Therefore, the user can rapidly deal with the event which has occurred.

According to the exemplary embodiments, even when only a display area from an entire monitoring area is displayed on a screen, a user can be provided with detailed information about an event which has occurred outside the display area. For this reason, the entire monitoring area does not necessarily need to be displayed. Therefore, the exemplary embodiments provide an environment for intensive monitoring by displaying only a display area. In particular, when a wide range of monitoring area is photographed with a high-definition camera, a fisheye lens camera, or a plurality of cameras, it is possible to improve efficiency of a monitoring system by intensively monitoring a display area.

According to the exemplary embodiments, since a user can be provided with information about a location of a monitoring target as well as an event which has occurred in an area other than a display area, it is possible to prevent an accident from occurring at the monitoring target. In other words, while a user can deal with an accident through event occurrence information after the accident occurs, the exemplary embodiments make it possible to prevent an accident through location information about a monitoring target. For example, using location information about a child who is outside a display area, a user can prevent an accident involving the child.

Effects of the inventive concept are not limited to those mentioned above, and various other effects are included in the specification.

DESCRIPTION OF THE EXEMPLARY EMBODIMENTS

The embodiments described herein are all exemplary embodiment. Advantages and features of the embodiment of the inventive concept and a method of achieving the same will be clearly understood from embodiments described below in detail with reference to the accompanying drawings. However, the inventive concept is not limited to the following embodiments and may be implemented in various different forms. The embodiments are provided merely for complete disclosure of the inventive concept and to fully convey the scope of the inventive concept to those of ordinary skill in the art to which the inventive concept pertains. The inventive concept is defined only by the scope of the claims. Throughout this specification, like reference numbers refer to like elements.

Unless otherwise defined, all terms (including technical and scientific terms) used herein have the same meaning as commonly understood by those of ordinary skill in the art to which the inventive concept pertains. Terms defined in commonly used dictionaries are not to be interpreted in an idealized or overly formal sense unless expressly so defined herein.

Terms used herein are intended to describe embodiments and are not intended to limit the inventive concept. In this specification, the singular includes the plural unless the context clearly indicates the contrary. As used herein, "comprises" and/or "comprising" do not exclude the presence or addition of one or more elements other than stated elements.

Hereinafter, various embodiments will be described in detail with reference to the accompanying drawings.

Figure 1:
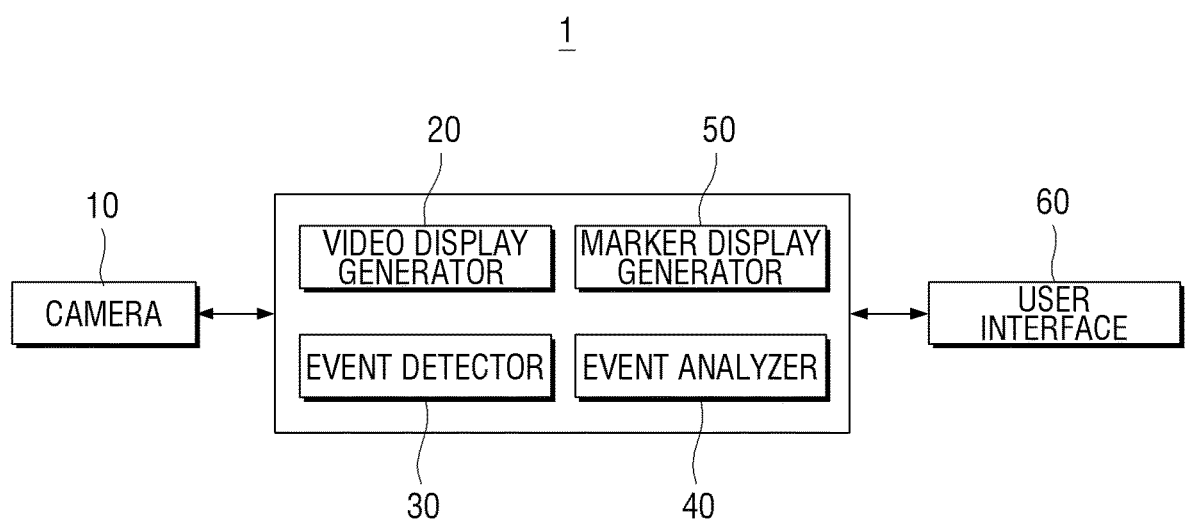
FIG. 1 shows a video monitoring apparatus according to an embodiment.

FIG. 1 shows a video monitoring apparatus 1 according to an embodiment. In an embodiment, the video monitoring apparatus 1 includes a camera 10, a video display generator 20, an event detector 30, an event analyzer 40, a marker display generator 50, and a user interface 60.

The camera 10 is a device for photographing a monitoring area. A resolution of a video captured by the camera 10 may include high resolutions, such as ultra-high definition (UHD; 3840×2160) and 8K UHD (7680×4320). UHD is a resolution which is nine times higher than that of HD (1280×720) and four times higher than that of full HD (FHD; 1920×1080), and 8K UHD is a resolution which is 16 times higher than that of FHD. Even in the case of photographing a wide range of area with one camera, it is possible to acquire a clear video with a high-definition camera.

The camera 10 may have a function of acquiring audio information about the monitoring area together with video information about the monitoring area. When the camera 10 is equipped with a microphone, the audio information may be acquired by the camera 10. Otherwise, the audio information may be acquired and transferred by other equipment in the monitoring area.

The video display generator 20 is a device for visually displaying a display area included in the monitoring area.

The video display generator 20 may visually display the display area on a screen of a display device (not shown).

Figure 2A:
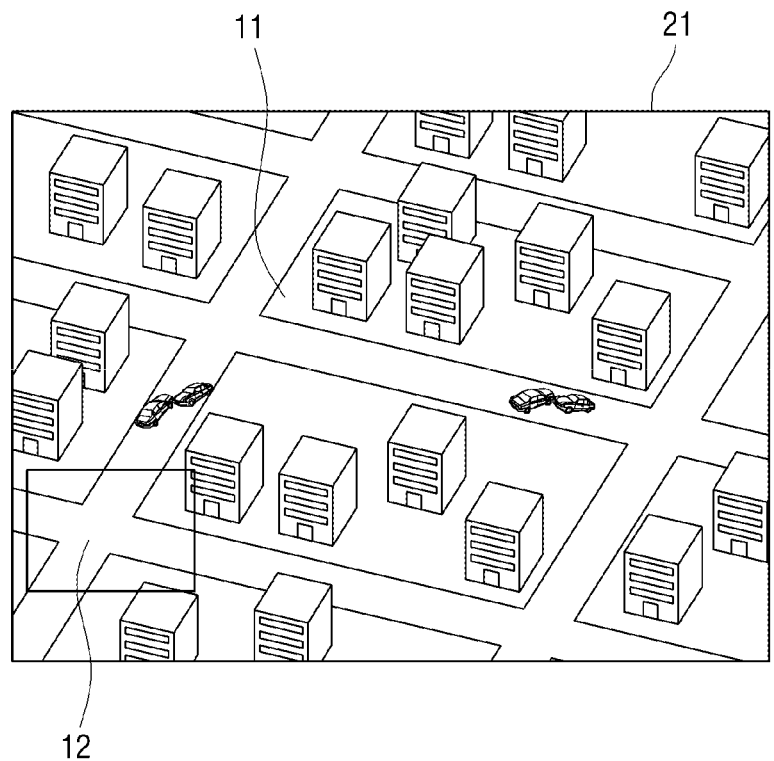
FIGS. 2A and 2B show a monitoring area and a display area of a video monitoring apparatus, respectively, according to an embodiment.
Figure 2B:
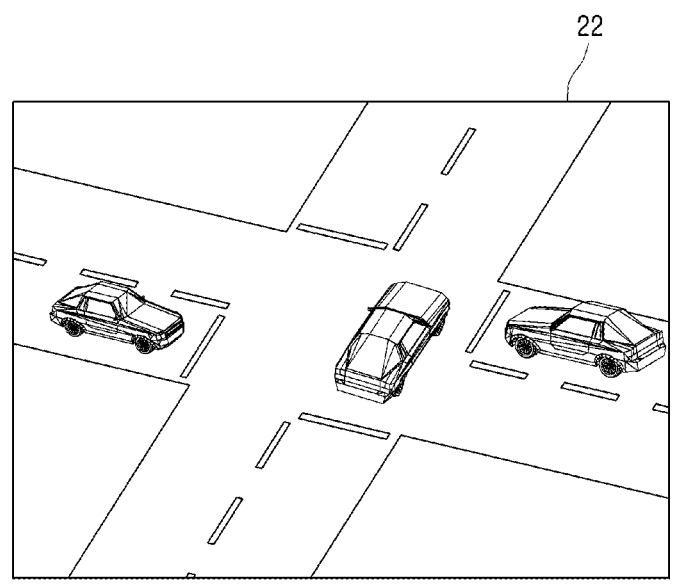

A monitoring area 11 and a display area 12 are compared with each other in FIGS. 2A and 2B. FIGS. 2A and 2B show the monitoring area 11 and the display area 12, respectively. The monitoring area 11 is an area photographed by the camera 10, and the display area 12 is visually displayed on the screen of the display device as an area included in the monitoring area 11 and smaller than the monitoring area 11. Although the camera 10 acquires a first video 21 by photographing the monitoring area 11, a second video 22 displayed on the screen of the display device includes only the display area 12 in the monitoring area 11.

Referring to FIGS. 2A and 2B, the monitoring area 11 includes multiple buildings and roads, and the display area 12 includes one intersection included in the monitoring area 11. When the monitoring area 11 is displayed on a screen with a limited screen size, the intersection is displayed in a small size, and it may be difficult to closely monitor the intersection. However, since the video display generator 20 displays only the display area 12 on the screen, a user can intensively monitor the intersection.

Referring back to FIG. 1, the event detector 30 is a device for detecting whether an event has occurred in the monitoring area 11. An event detected by the event detector 30 includes a motion event and a sound event. The motion event is an event related to movement of an object, and the sound event is an event related to generation of a sound.

To detect whether an event has occurred, the event detector 30 may use video information and/or audio information acquired by the camera 10. As discussed above, the audio information may be acquired by a separate device located in the monitoring area 11. The event detector 30 may detect whether there has been a movement in the monitoring area 11 using information about the first video 21 acquired from the camera 10. Also, the event detector 30 may detect whether there has been a sound in the monitoring area 11 using audio information acquired from the camera 10.

Further, the event detector 30 may detect where an event has occurred in the first video 21 and what type of event has occurred. When a movement is detected in the monitoring area 11 using information about the first video 21, the event detector 30 may detect a place in which the movement has occurred in the first video 21 through coordinates of a pixel at which the movement has occurred. Also, the event detector 30 may find the type of event which has occurred using shape information about an object which has generated the movement in the first video 21, acquired audio information, and the like. For example, when movements of two vehicle-shaped objects moving toward each other and colliding with each other and a sound of a vehicle collision are detected, the event detector 30 may determine the type of event to be a "vehicle collision." Alternatively, the event detector 30 may determine the type of event by comparing shape information about an object and audio information with metadata.

The event detector 30 may further include a function of detecting a location of a specific monitoring target in the monitoring area 11. The specific monitoring target may be a device to which the Internet of Things (IoT) is applied, and the event detector 30 may detect the location of the specific monitoring target by exchanging information with the specific monitoring target. For example, it is possible to detect a location of a vehicle parked in a parking lot by exchanging information between the vehicle and the event detector 30. Alternatively, the event detector 30 may detect the location of the specific monitoring target using a sensor, such as a beacon.

In other words, the event detector 30 includes a pre-detection function, such as a function for detecting a location of a specific monitoring target together, with a post-detection function for detecting a movement, a sound, and the like. While the post-detection function of the event detector 30 makes it possible to deal with an event after the accident occurs, the pre-detection function of the event detector 30 makes it possible to prevent occurrence of an event. For example, when a location of a child having a smartphone is detected using a beacon, it is possible to use information indicating that the child is outside the display area 12, in a dangerous area, or the like in order to prevent an accident involving the child.

The event analyzer 40 performs a function of analyzing an event detected by the event detector 30. When a person is detected by the event detector 30, the event analyzer 40 may find whether the detected person is angry, nervous, etc. by analyzing the detected person's facial expression. Alternatively, when a loud voice is detected by the event detector 30, the event analyzer 40 may analyze or determine whether the detected loud voice is a cheer, a scream, or the like.

The marker display generator 50 is a device for displaying, when an event occurs outside the display area 12, an event marker indicating occurrence of the event on the second video 22. The marker display generator 50 may display the event marker to be superimposed on the second video 22.

When an event occurs in an area other than the display area 12, a user cannot visually recognize the event through the second video 22. Therefore, the marker display generator 50 displays an event marker on the second video 22 so that a user can recognize the event having occurred in the area other than the display area 12.

The event marker includes detailed information about an event which has occurred. The event marker may include information for visually finding a location at which the event has occurred on the basis of the display area 12. The event marker may be an arrow whose length corresponds to a distance from the display area 12 to the location at which the event has occurred and whose direction corresponds to the direction from the display area 12 to the location at which the event has occurred. Alternatively, the event marker may be text representing the distance or direction from the display area to the location at which the event has occurred instead of the arrow. For example, when an event occurs at a place 3 km northeast from the center point of the display area 12, an event marker may be displayed as an arrow indicating the northeast direction on the second video 22. When an event occurs at a place farther away than 3 km, an event marker may be displayed as a longer arrow. Alternatively, an event marker may be displayed as an arrow indicating the northeast direction and the text "3 km" on the second video 22.

The event marker may include information for visually finding a location at which an event has occurred. For example, when an event occurs at 40 Central St., the event marker may be displayed as the text "40 Central St."

The event marker may include information representing a type of event which has occurred. When the type of event which has occurred is detected by the event detector 30 as a "vehicle collision," the event marker may be displayed as the text "vehicle collision." Alternatively, the event marker may be displayed as a diagram or an icon denoting an event which has occurred rather than text in order to represent the type of event.

The event marker may include information about an event analyzed by the event analyzer 40. For example, when there is a loud voice as an event and the event analyzer 40 analyzes the loud voice as a "scream," the event marker may be displayed as the text "a scream was heard."

Since the marker display generator 50 displays information about an event occurring outside the display area 12 on the second video 22 through the event marker, it is possible to provide information about events occurring in the monitoring area 11 to a user even when only the second video 22 is displayed. Therefore, the user can manage an event occurring outside the display area 12 while visually monitoring the display area 12 in the monitoring area 11.

Figure 3A:
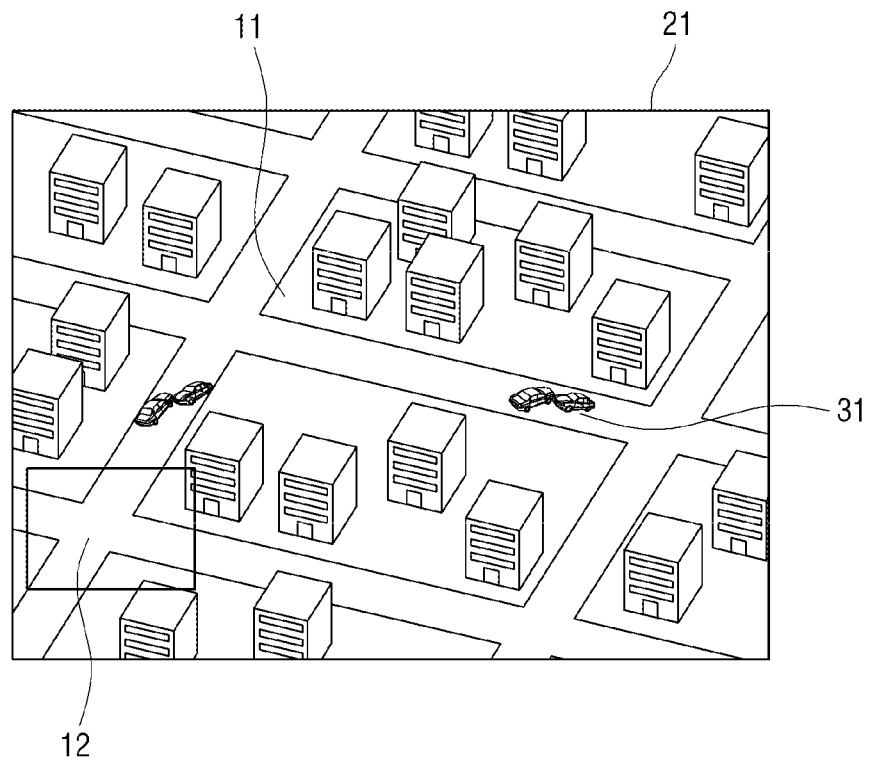
FIGS. 3A and 3B show an event having occurred in a monitoring area of a video monitoring apparatus and a second video in which an event marker is displayed, respectively, according to an embodiment.
Figure 3B:
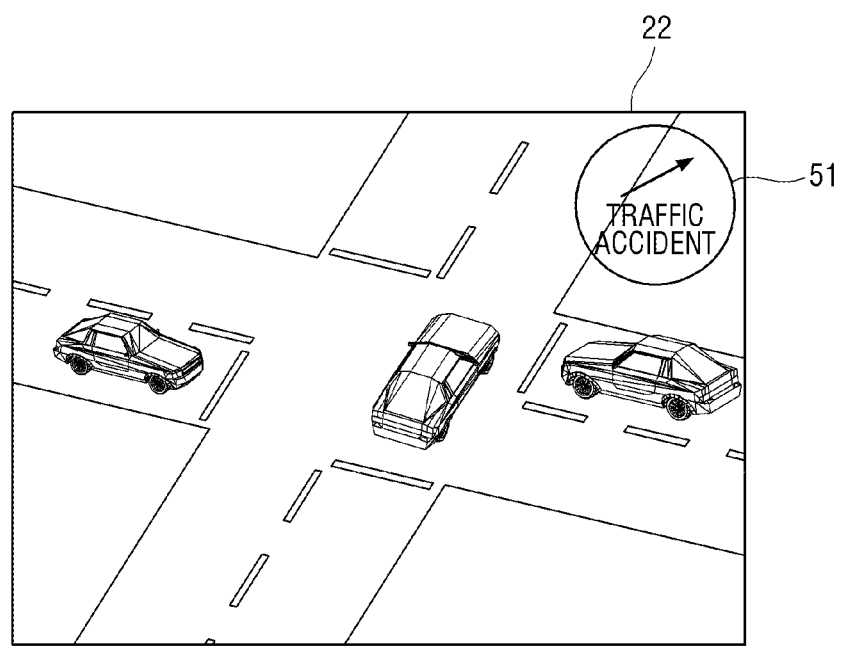

A manner in which the event detector 30 and the marker display generator 50 operate is described through an embodiment with reference to FIGS. 3A and 3B together with FIG. 1. FIGS. 3A and 3B show an event having occurred in a monitoring area 11 and a second video 22 in which an event marker is displayed, respectively. In the monitoring area 11 of FIG. 3A, a vehicle collision event 31 has occurred at a place 3 km northeast from a display area 12.

The event detector 30 detects a location at which the event has occurred and the type of event through a first video 21. The event detector 30 may detect a location and information about the vehicle collision event 31 as a "place 3 km northeast" from the display area 12 and as a "vehicle collision" through video information about the first video 21.

The marker display generator 50 displays an event marker 51 indicating occurrence of an event on the second video 22 so that a user can recognize the vehicle collision event 31 having occurred outside the display area 12. The event marker 51 includes detailed information about the vehicle collision event 31 which has occurred and may be displayed on the second video 22 as an arrow which has a direction corresponding to the northeast and a length corresponding to 3 km and the text "vehicle collision."

When a plurality of events occur, the marker display 50 generator may display a plurality of event markers corresponding to the plurality of events on the second video 22.

The marker display generator 50 may display an order of priority of the plurality of event markers according to the priority of the plurality of events. The order of the priority may be determined according to various criteria, such as priority orders previously set by a user or in order of increasing distance from event locations.

To display priority orders of the plurality of event markers, the marker display generator 50 may display the plurality of event markers in different colors, thicknesses, sizes, etc. or display notes, such as "high priority" and "medium priority," together with the plurality of event markers. For example, when first and second events occur as a plurality of events and the second event has a higher order of priority than the first event, an event marker for the second event may be displayed in red, and an event marker for the first event may be displayed in yellow.

Figure 4A:
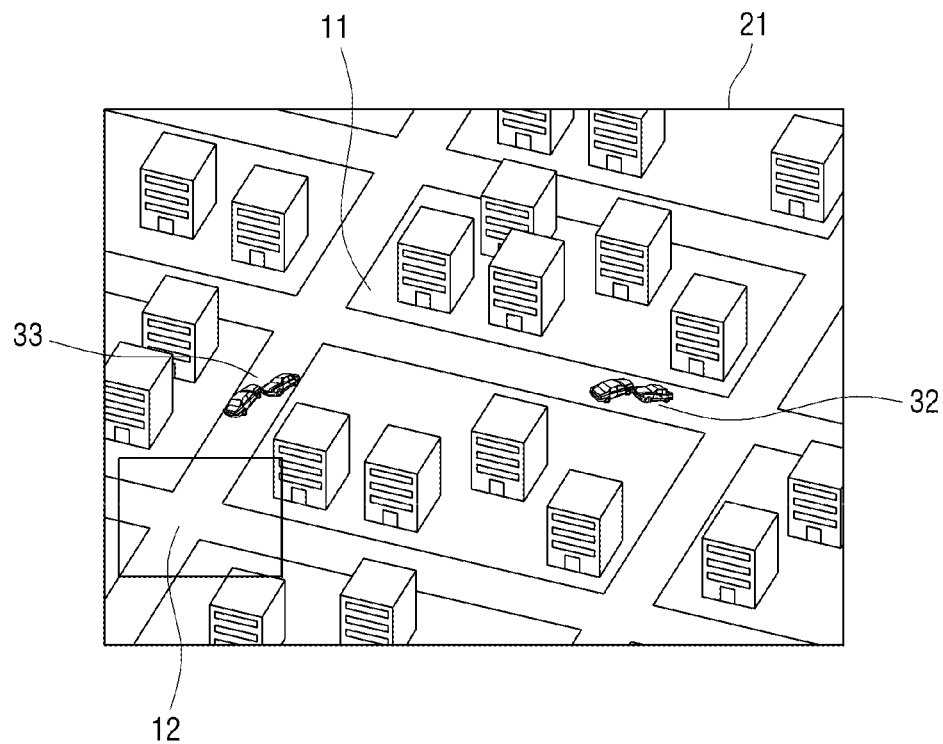
FIGS. 4A and 4B show a plurality of events having occurred in a monitoring area of a video monitoring apparatus and a second video in which a plurality of event markers are displayed, respectively, according to an embodiment.
Figure 4B:
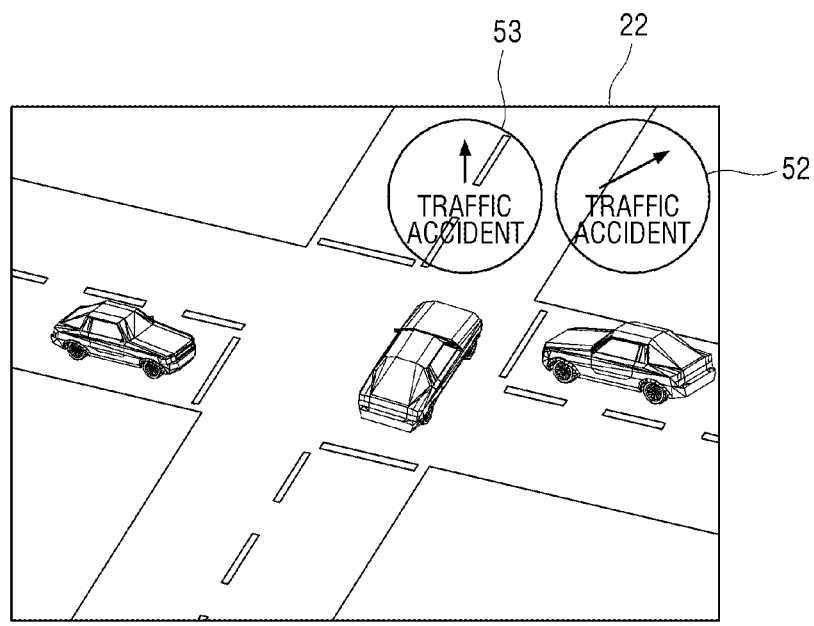

An embodiment related to a plurality of event markers is described with reference to FIGS. 4A and 4B together with FIG. 1. FIGS. 4A and 4B show a plurality of events having occurred in a monitoring area 11 and a second video 22 in which a plurality of event markers are displayed. In the monitoring area 11 of FIG. 4A, a first event 32, which is a vehicle collision, has occurred at a place 3 km northeast from a display area 12, and a second event 33, which is a vehicle collision, has occurred at a place 1 km north from the display area 12.

The marker display generator 50 may display, on the second video 22, each of a first event marker 52 indicating a location and a type of the first event 32 and a second event marker 53 indicating a location and a type of the second event 33. In this case, since the place at which the second event 33 has occurred is closer to the display area 12 than the place at which the first event 32 has occurred, an arrow of the second event marker 53 may be displayed shorter than that of the first event marker 52. Also, when the second event 33 has a higher priority order than the first event 32, the second event marker 53 and the first event marker 52 may be displayed with the notes "high priority" and "medium priority," respectively.

The user interface 60 is a device which receives an input to control a display area displayed on the screen of a display device (not shown) from a user. The user interface 60 includes an input means for receiving an input from a user. The input means may be, for example, a mouse or a touch screen, not being limited thereto.

When an event occurs in the monitoring area 11 other than the display area 12 and a user selects an event marker through the user interface 60, the video display generator 20 may set an area including a location at which the event has occurred as a display area. A method by which the video display generator 20 displays an event occurrence area according to an input from the user interface 60 is described with reference to FIGS. 5 to 7.

Figure 5:
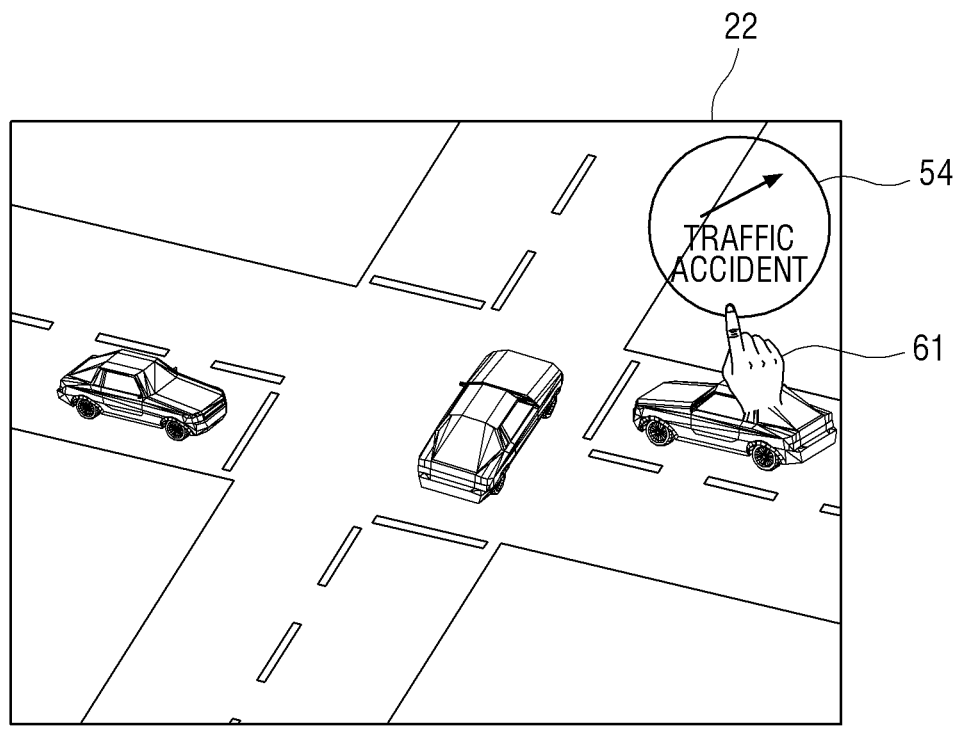
FIGS. 5 to 7 show methods of displaying an event occurrence area in a video monitoring apparatus, according to embodiments.
Figure 5:
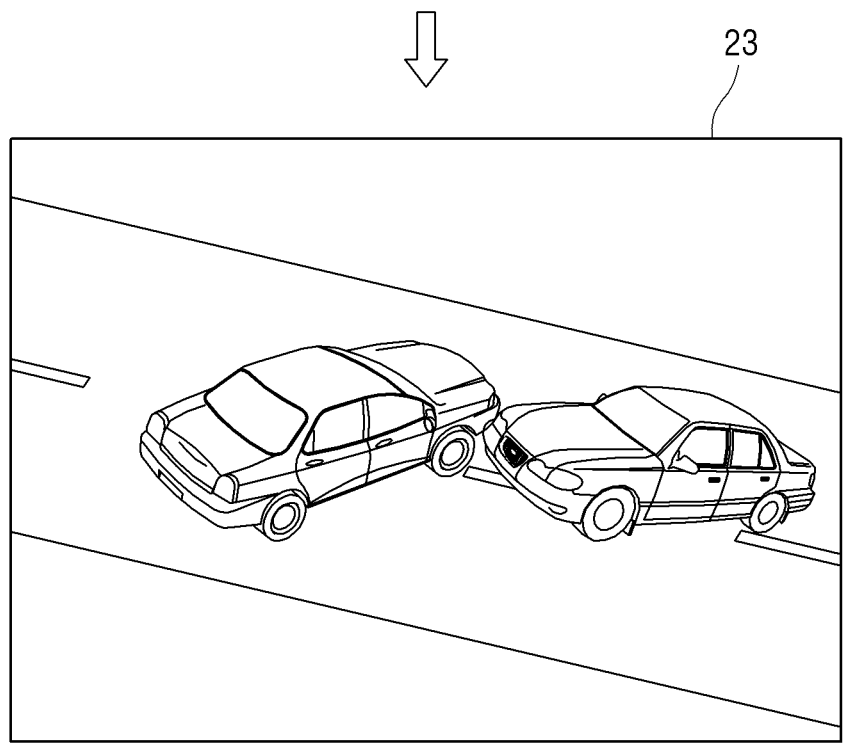
Figure 6:
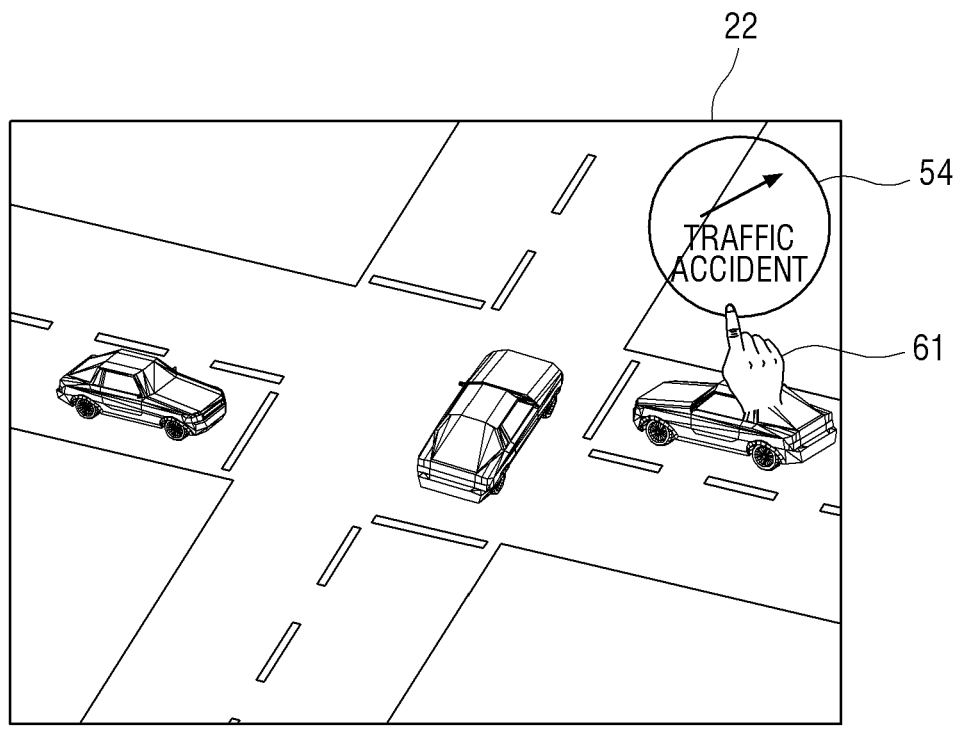
Figure 6:
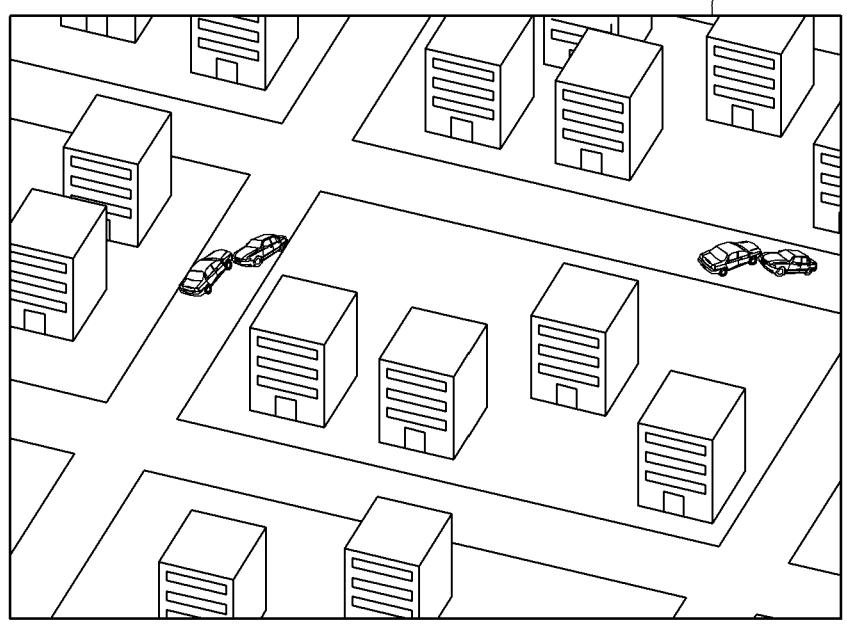
Figure 7:
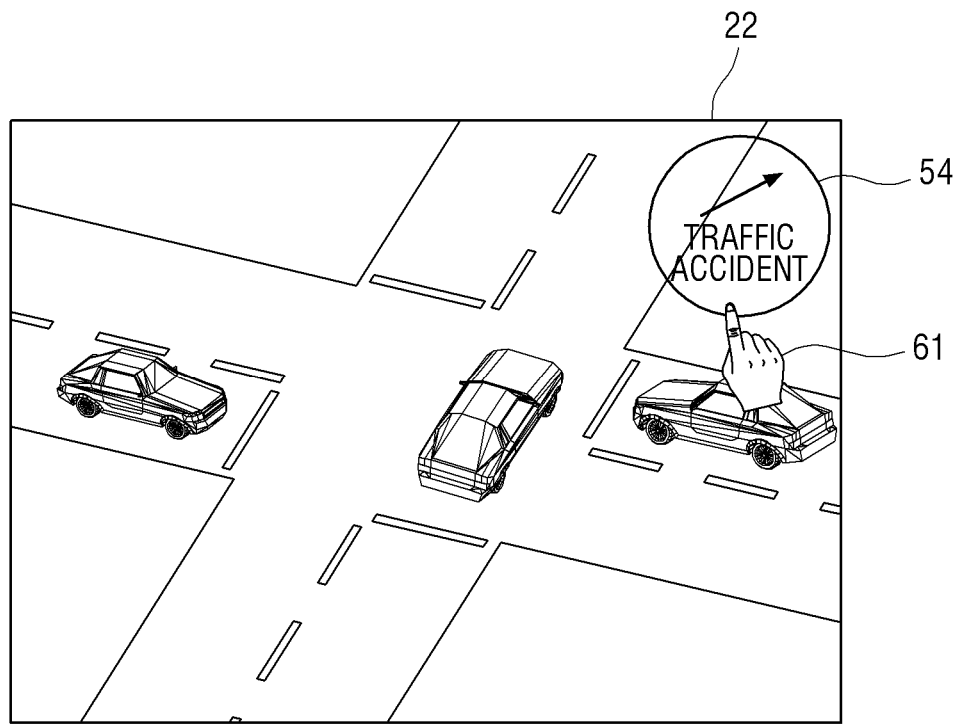
Figure 7:
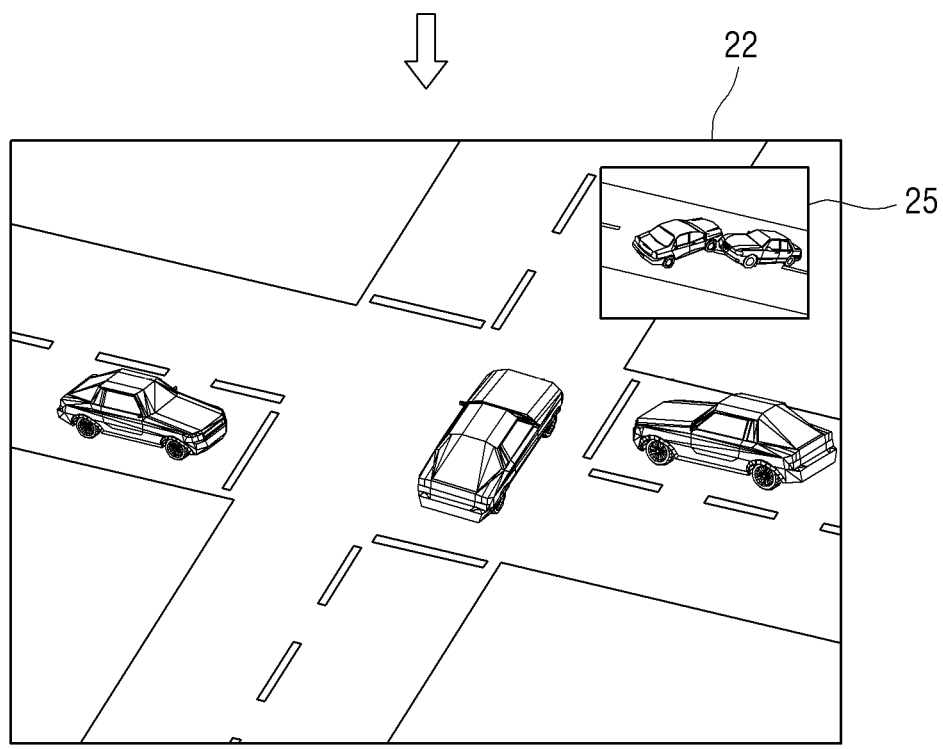

FIGS. 5 to 7 show methods of displaying an event occurrence area. FIGS. 5 to 7 show different methods for displaying an area in which an event has occurred when the same event occurs. The event is assumed to be a vehicle collision event which has occurred at a place 3 km northeast from a display area.

Referring to FIG. 5, when a user 61 selects an event marker 54 displayed on the second video 22, the video display generator 20 moves the display area to a location at which the event indicated by the event marker 54 has occurred and displays a second video 23 including the location at which the event has occurred. While moving the display area 12 to the location at which the event has occurred, the video display generator 20 displays a plurality of second videos so that areas displayed in the second videos may be continuous with the movement of the display area 12. In this way, it is possible to make the user recognize a direction in which the display area moves through the second videos.

Another method of displaying an event occurrence area is described with reference to FIG. 6. When the user 61 selects the event marker 54 displayed on the second video 22, the video display generator 20 zooms out of the display area 12 so that a second video 24 including the location at which the event has occurred may be displayed. Since the zoomed-out second video 24 includes both the display area 12 before the zooming out and the location at which the event has occurred, the user 61 may acquire visual information about the monitoring area 11 from the display area 12 before the zooming out to the location at which the event has occurred.

Another method of displaying an event occurrence area is described with reference to FIG. 7. When the user 61 selects the event marker 54 displayed on the second video 22, the video display generator 20 pops a third video 25 up including the location at which the event has occurred on the second video 22. While continuously monitoring the display area 12 through the second video 22, the user can acquire information about the location at which the event has occurred through the third video 25.

A configuration and operating method of the video monitoring apparatus according to the embodiments have been described above with reference to FIGS. 1 to 7. In the video monitoring apparatus according to the embodiments, a monitoring area photographed by a camera may differ from a display area displayed on a screen. In this case, even when an event occurs outside the display area, it is possible to provide event information to a user, and the user can immediately monitor an area in which the event has occurred by displaying the area on a screen according to the provided information.

Other embodiments to which a video monitoring apparatus according to the present invention may be applied are described below with reference to FIGS. 8A to 12.

Figure 8A:
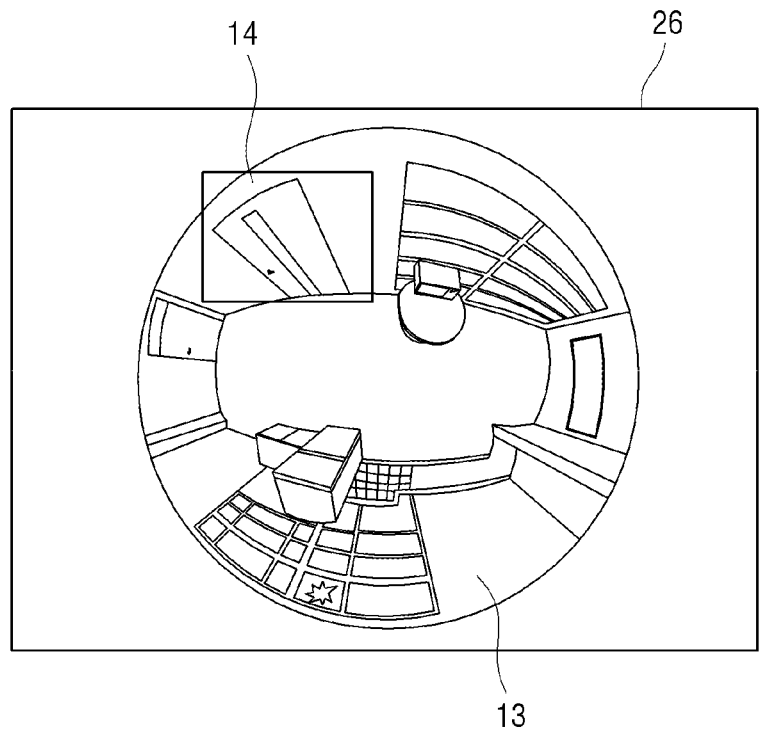
FIGS. 8A and 8B show a monitoring area and a display area of a video monitoring apparatus, according to another embodiment.
Figure 8B:
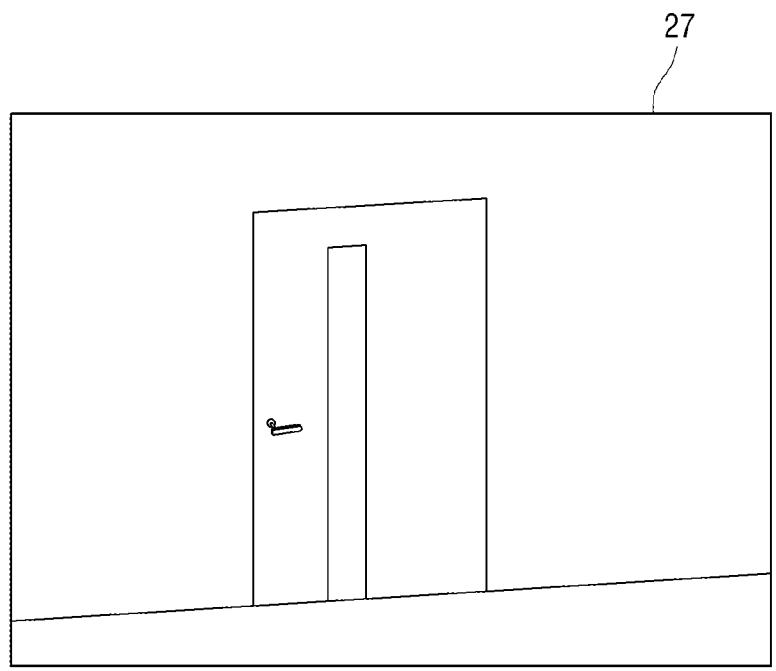

FIGS. 8A and 8B show a monitoring area and a display area of a video monitoring apparatus according to another embodiment. The video monitoring apparatus according to the other embodiment has the same configuration as the video monitoring apparatus 1 shown in FIG. 1 according to the embodiment except that a fisheye lens is used in the camera 10. The fisheye lens can take a video at a viewing angle of 180° or more due to its short focal length. Therefore, the video monitoring apparatus according to the other embodiment can acquire a video of a wider area than that of the case in which a general lens is used.

Referring to FIGS. 8A and 8B, a monitoring area 13 is an area photographed by the fisheye lens camera 10, and a display area 14 is included in the monitoring area 13 and is visually displayed on a screen as a smaller area than the monitoring area 13. The fisheye lens camera 10 acquires a warped first video 26 by photographing the monitoring area 13, but a second video 27 displayed on the screen includes only a dewarped display area in the monitoring area 13.

The monitoring area 13 includes a 360° whole view of an indoor area, and the display area 14 includes one entrance door in the monitoring area 13. When the monitoring area 13 is dewarped and displayed on the screen, an area of a video displayed on a screen is increased because the warped video is spread, and indoor objects are displayed in a relatively small size. Therefore, close monitoring may be difficult. However, since the video display 20 displays only a dewarped display area on the screen, a user can intensively monitor the entrance door.

Figure 9A:
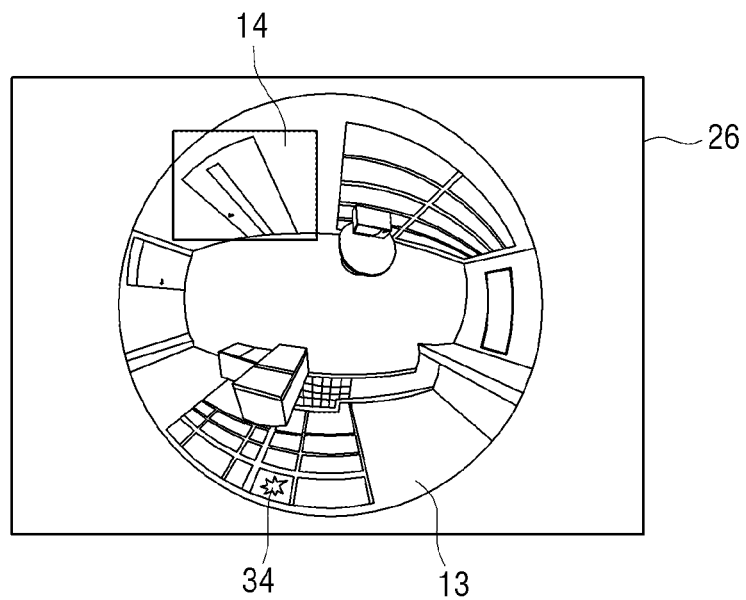
FIGS. 9A and 9B show a method of displaying an event occurrence area in the video monitoring apparatus, according to the other embodiment.
Figure 9B:
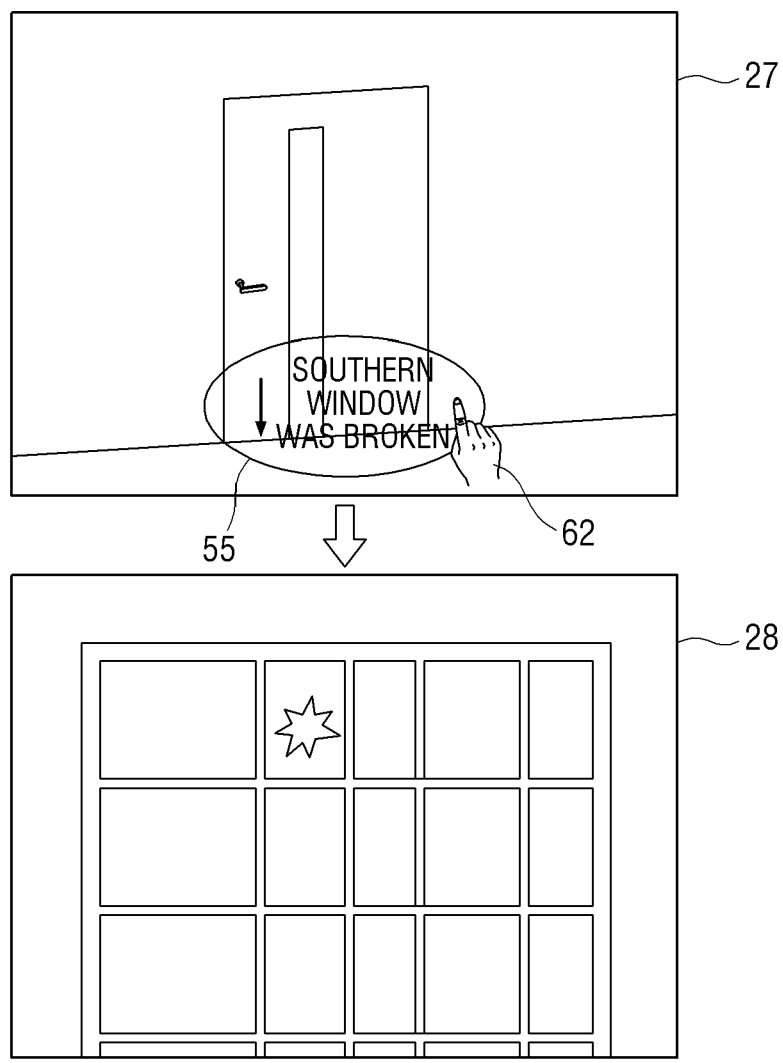

FIGS. 9A and 9B show a method of displaying an event occurrence area in the video monitoring apparatus according to the other embodiment. The video monitoring apparatus according to the other embodiment is the same as the video monitoring apparatus according to the embodiment except for the fisheye lens camera 10, and thus, can operate in the same way as described above with reference to FIGS. 5 to 7.

In the monitoring area 13 of FIG. 9A, an event 34, which is window breaking, has occurred to the south of the display area 14. The event detector 30 detects the event 34 of the window breaking using the first video 26, and the marker display generator 50 displays an event marker 55 including information about the event which has occurred on the second video 27 as shown in FIG. 9B. When a user 62 selects the event marker 55 displayed on the second video 27, the video display generator 20 moves the display area 14 to the location at which the event indicated by the event marker 55 has occurred and displays a second video 28 including an area in which the event has occurred. Alternatively, the video display generator 20 may display an area in which the event has occurred by zooming out of the display area 14 so that the area in which the event has occurred may be included in the display area 14 or by popping a third video up showing the area in which the event has occurred on the second video 27.

Figure 10:
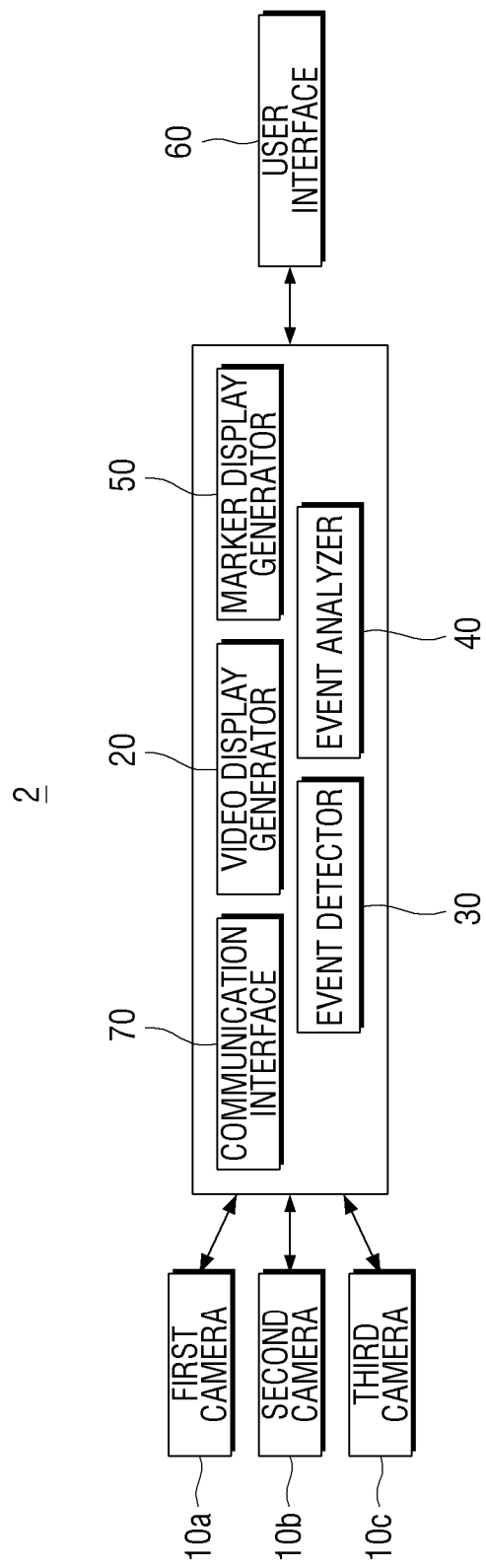
FIG. 10 shows a video monitoring apparatus according to another embodiment.

FIG. 10 shows a video monitoring apparatus 2 according to another embodiment. The video monitoring apparatus 2 according to the other embodiment differs from the video monitoring apparatus 1 according to the embodiment of FIG. 1 in that first, second, and third cameras 10a, 10b, and 10c and a communication interface 70 are included. A configuration and operating method of the video monitoring apparatus 2 are the same as those of the video monitoring apparatus 2 according to the embodiment, and the same description will not be reiterated.

When monitoring areas are photographed by the plurality of cameras 10a, 10b, and 10c, all the monitoring areas may be displayed on a screen. However, when all videos photographed by the first, second, and third cameras 10a, 10b, and 10c are displayed on a screen with a limited screen size, close monitoring may be difficult. Although only three cameras are shown in FIG. 10, close monitoring may be more difficult when tens of cameras are used. Therefore, the video display generator 20 displays only an area(s) photographed by a limited number of cameras on the screen such that a user can intensively monitor the displayed area.

The communication interface 70 is a device for transmitting information about an event to the first, second, and third cameras 10a, 10b, and 10c. When an event occurs outside a display area photographed by the current camera, the communication interface 70 transmits information about the location at which the event has occurred to other cameras so that the other cameras may photograph the event.

Figure 11A:
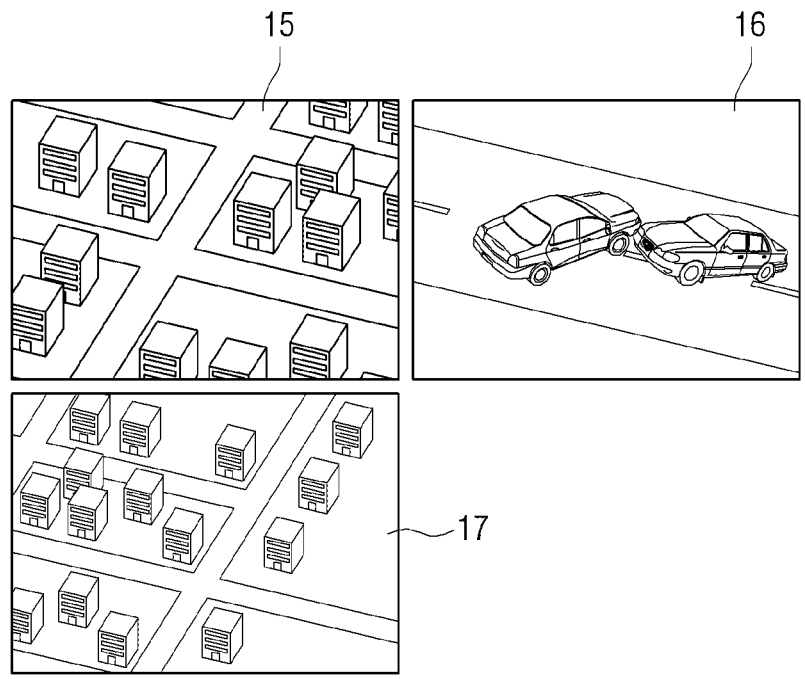
FIGS. 11A and 11B show a monitoring area and a display area, respectively, of the video monitoring apparatus according to the other embodiment.
Figure 11B:
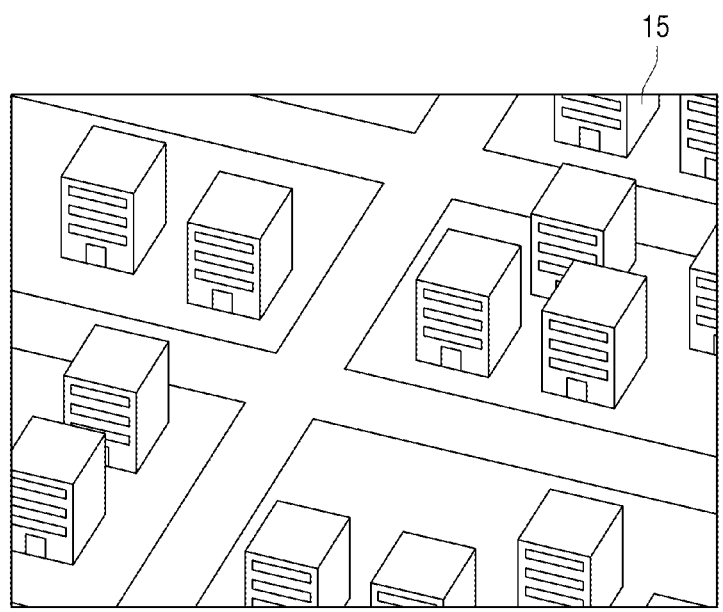

FIGS. 11A and 11B show a monitoring area and a display area, respectively, of the video monitoring apparatus according to the other embodiment. According to the other embodiment, the video display generator 20 displays only an area photographed by a camera 10a on the screen. Therefore, a monitoring area is all of areas 15, 16, and 17 photographed by the first, second, and third cameras 10a, 10b, and 10c, and an area photographed by the first camera 10a among the first, second, and third cameras 10a, 10b, and 10c is a display area.

Figure 12:
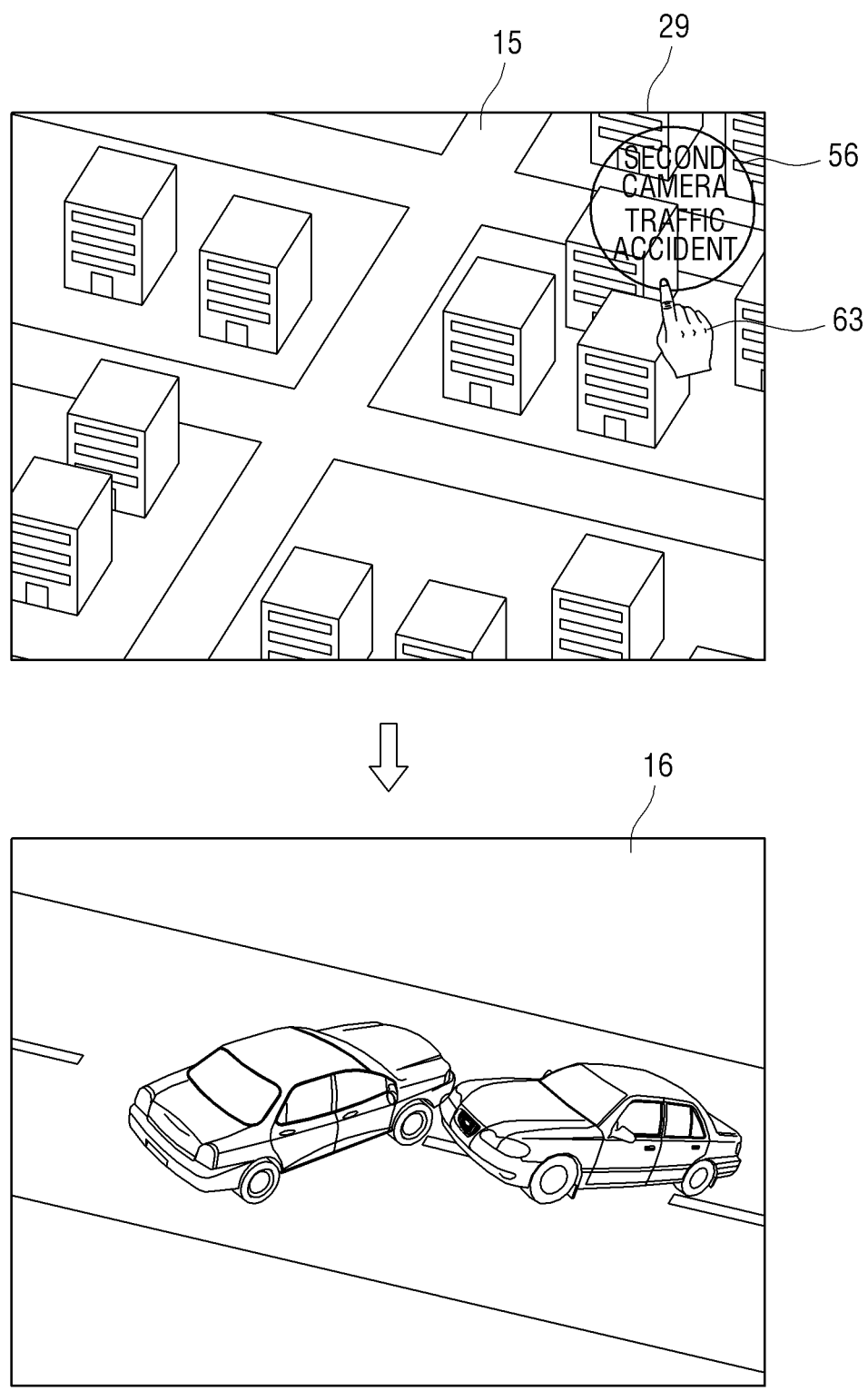
FIG. 12 shows a method of displaying an event occurrence area in the video monitoring apparatus according to the other embodiment.

FIG. 12 shows a method of displaying an event occurrence area in the video monitoring apparatus according to the other embodiment. The video monitoring apparatus according to the other embodiment is the same as the video monitoring apparatus according to the embodiment except for the plurality of cameras and thus can operate in the same way as described above with reference to FIGS. 5 to 7.

In a second video 29 of FIG. 12, the display area 15 photographed by the first camera 10a is displayed. When an event occurs outside the display area 15, the event detector 30 detects the event which has occurred, and the marker display generator 50 displays, on the second video 29, an event marker 56 including information about the event which has occurred.

The event marker 56 may include identification information about another camera which has photographed the event which has occurred. In FIG. 12, "second camera" is shown in the event marker 56 as the identification information about the other camera which has photographed the event which has occurred.

When a user 63 selects the event marker 56 displayed on the second video 29, the video display generator 20 may display a video of the second camera 10b indicated by the event marker 56. Accordingly, the display area 16 photographed by the second camera 10b is displayed on the second video 29.

When the user 63 selects the event marker 56, the communication interface 70 may transmit information about the location at which the event indicated by the event marker 56 has occurred to the second camera 10b or the third camera 10c in order to control the other cameras to photograph the location at which the event has occurred. Although the second camera 10b is photographing the location at which the event has occurred, the second camera 10b may receive the location information for more detailed photography. When the received event location is in an area that can be photographed by the third camera 10c, the third camera 10c may switch its photographing area to an area in which the event has occurred and photograph the area.

Unlike the embodiment shown in FIG. 12, when an event occurs in an area photographed by the third camera 10c at the same time as the event occurring in an area photographed by the second camera 10b, the marker display generator 50 may display a plurality of event markers relating to the plurality of cameras each corresponding to the plurality of events on the second video 29.

Figure 13:
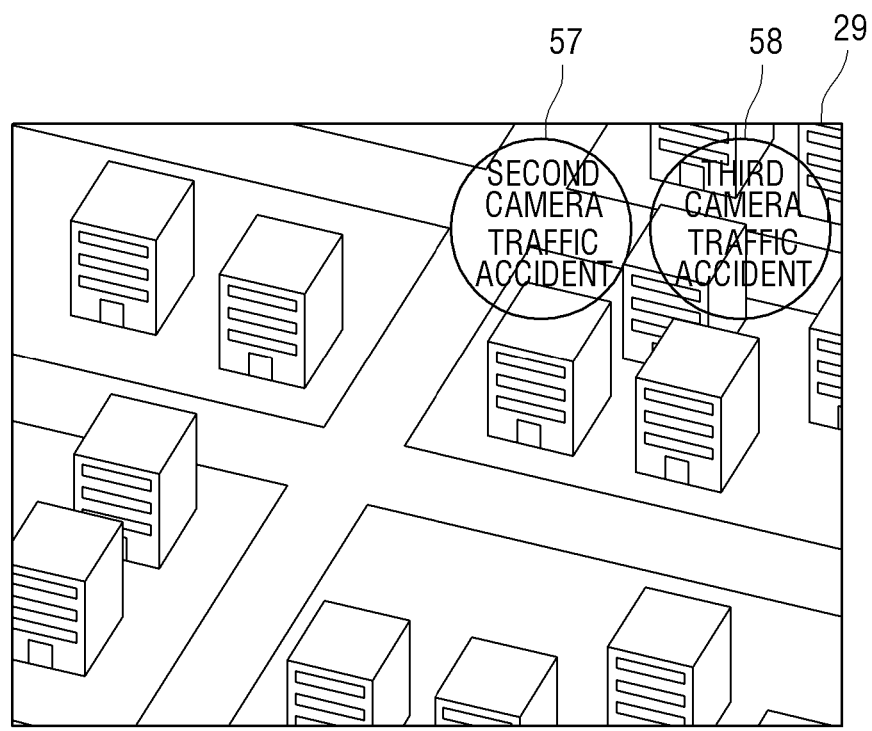
FIG. 13 shows a second video in which a plurality of event markers are displayed in the video monitoring apparatus according to the other embodiment.

FIG. 13 shows the second video 29 in which a plurality of event markers are displayed. A first event marker 57 displayed by the marker display 50 indicates an event which has occurred in the area photographed by the second camera 10b, and a second event marker 58 indicates an event which has occurred in the area photographed by the third camera 10c. The marker generator 50 may display the event markers differently by at least one of color, thickness, line type, and note so that the plurality of events corresponding to the plurality of cameras may be distinguished from each other. In FIG. 13, the first event marker 57 and the second event marker 58 are displayed with different notes "second camera" and "third camera," respectively. Instead, however, the first event marker 57 may be displayed in red, and the second event marker 58 may be displayed in blue such that the plurality of events corresponding to the plurality of cameras may be distinguished from each other.

At least one of the components, elements, modules or units (collectively "components" in this paragraph) represented by a block in the drawings such as FIGS. 1 and 10 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art to which the inventive concept pertains would understand that the embodiments can be implemented in other specific forms without changing the technical spirit or essential features of the inventive concept. Therefore, it should be understood that the above-described embodiments are exemplary in all aspects and not limitative. The scope of the inventive concept is defined in the following claims rather than the above descriptions, and it should be interpreted that the meanings and ranges of the claims and all modifications derived from the concept of equivalents fall within the scope of the inventive concept.

What is claimed is:

1. A video monitoring apparatus connectable to a camera which acquires a first video by photographing a monitoring area that includes a first area and a second area, the video monitoring apparatus comprising:
   at least one processor configured to implement:
      a video display generator configured to display a second video of a display area, that includes the first area of the monitoring area, on a screen of a display device while the screen does not display the second area of the monitoring area, the second video obtained from the first video;
      an event detector configured to detect, based on at least a portion of the first video, whether an event has occurred in the monitoring area; and
      a marker display generator configured to display, while the screen does not display the second area, an event marker indicating occurrence of the event, that is detected by the event detector based on at least the portion of the first video, on the second video when the event has occurred in the second area of the monitoring area of the first video,
   wherein the at least one processor is connectable to the camera which acquires the first video.

2. The video monitoring apparatus of claim 1, wherein the event marker comprises information for finding an event location at which the event has occurred in the monitoring area.

3. The video monitoring apparatus of claim 2, wherein the event marker comprises an arrow a length of which corresponds to a distance from the display area to the event location and a direction of which corresponds to a direction from the display area to the event location.

4. The video monitoring apparatus of claim 3, wherein the event marker further comprises information about a type of the event.

5. The video monitoring apparatus of claim 1, wherein when a user selects the event marker, the video display generator displays a third video comprising an event location at which the event has occurred by moving the display area to the event location or zooming out of the display area, and
   wherein the third video is obtained from the first video.

6. The video monitoring apparatus of claim 1, wherein when a user selects the event marker, the video display generator displays a third video comprising an event location at which the event has occurred,
   wherein, prior to displaying the third video comprising the event location, the video display displays an area of the monitoring area between the display area and the second area that includes the event location, and
   wherein the third video is obtained from the first video.

7. The video monitoring apparatus of claim 1, wherein when a user selects the event marker, the video display generator pops up a third video including an event location at which the event has occurred.

8. The video monitoring apparatus of claim 1, wherein when a plurality of events occur in the monitoring area, the marker display generator displays a plurality of event markers corresponding to the plurality of events on the second video.

9. The video monitoring apparatus of claim 8, wherein the marker display generator displays priorities of the plurality of events on the plurality of event markers.

10. The video monitoring apparatus of claim 9, wherein the marker display generator displays the plurality of event markers in different colors according to the priorities.

11. The video monitoring apparatus of claim 1, wherein the first video is a video warped by a fisheye lens, and
wherein the second video is a video obtained by dewarping the warped video.

12. The video monitoring apparatus of claim 1, wherein the at least one processor is connectable to a plurality of cameras, including the camera and additional cameras, the additional cameras photograph additional monitoring areas.

13. The video monitoring apparatus of claim 12, wherein the event marker comprises identification information about one of the additional cameras.

14. The video monitoring apparatus of claim 13, wherein when a user selects the event marker, the video display generator displays a third video of one of the additional cameras indicated by the event marker.

15. The video monitoring apparatus of claim 14, further comprising a communication interface including hardware, the communication interface configured to transmit, when the user selects the event marker, information about an event location at which the event has occurred, to the one of the additional cameras or to another camera among the additional cameras in order to control the one of the additional cameras or the other camera to photograph the event location.

16. The video monitoring apparatus of claim 12, wherein when multiple events are detected by the event detector, the marker display generator displays multiple event markers relating to multiple cameras from among the additional cameras corresponding to the multiple events on the second video.

17. The video monitoring apparatus of claim 16, wherein the marker display generator displays the multiple event markers differently by at least one of color, thickness, line type, and note so that the multiple events are distinguished from one another.

18. The video monitoring apparatus of claim 1, wherein the event detector detects an event on the basis of at least one of a movement occurring in the monitoring area and a sound made in the monitoring area.

19. The video monitoring apparatus of claim 1, wherein the at least one processor is further configured to implement an event analyzer configured to analyze the event,
wherein the event marker comprises information about the analysis of the event analyzer.

20. The video monitoring apparatus of claim 1, wherein the event detector is further configured to detect a location of a monitoring target in the monitoring area, and
wherein the marker display generator is further configured to display, while the screen does not display the second area, information about the location of the monitoring target on the second video when the detected location of the monitoring target is in the monitoring area, in the second area of the monitoring area.

* * * * *